United States Patent
Steen et al.

(10) Patent No.: US 7,396,317 B2
(45) Date of Patent: Jul. 8, 2008

(54) VEHICLE AND METHOD FOR AUTOMATIC GEAR SELECTION IN A GEARBOX FORMING PART OF A VEHICLE

(75) Inventors: Marcus Steen, Angered (SE); Anders Eriksson, Göteborg (SE); Erik Lauri, Mölndal (SE)

(73) Assignee: Volvo Lastvagnar AB, Gothenburg (SE)

( * ) Notice: Subject to any disclaimer, the term of this patent is extended or adjusted under 35 U.S.C. 154(b) by 290 days.

(21) Appl. No.: 10/709,385

(22) Filed: Apr. 30, 2004

(65) Prior Publication Data

US 2006/0148615 A1    Jul. 6, 2006

Related U.S. Application Data

(63) Continuation of application No. PCT/SE02/01992, filed on Oct. 31, 2002, now abandoned.

(30) Foreign Application Priority Data

Oct. 31, 2001    (SE)    ................... 0103615-1

(51) Int. Cl.
*B60W 10/04*    (2006.01)
*G06F 7/00*    (2006.01)

(52) U.S. Cl. .................... 477/115; 477/900; 701/55
(58) Field of Classification Search ............ 477/3, 477/107, 110, 111, 115, 121, 122, 900, 901; 701/55

See application file for complete search history.

(56) References Cited

U.S. PATENT DOCUMENTS

| | | | |
|---|---|---|---|
| 4,669,335 A | 6/1987 | Matsuoka et al. | |
| 4,972,737 A | 11/1990 | Makimoto | |
| 5,076,116 A | 12/1991 | Sasaki | |
| 5,611,753 A * | 3/1997 | Kondo et al. | 477/118 |
| 5,772,556 A * | 6/1998 | Tinschert et al. | 477/110 |
| 5,785,629 A | 7/1998 | Gierer et al. | |
| 6,019,701 A * | 2/2000 | Mori et al. | 477/46 |
| 6,253,139 B1 | 6/2001 | Borodani et al. | |
| 6,254,510 B1 * | 7/2001 | Rauch et al. | 477/132 |
| 6,275,760 B1 * | 8/2001 | Saito et al. | 701/55 |
| 6,394,931 B1 * | 5/2002 | Genise | 477/97 |
| 6,497,635 B2 * | 12/2002 | Suzuki | 477/3 |
| 6,519,520 B2 * | 2/2003 | Shin | 701/55 |
| 6,652,418 B1 * | 11/2003 | Gutknecht-Stohr et al. | 477/120 |
| 2002/0013650 A1 * | 1/2002 | Kusafuka et al. | 701/51 |

FOREIGN PATENT DOCUMENTS

WO    WO 01/55622 A1    8/2001

* cited by examiner

*Primary Examiner*—Roger Pang
(74) *Attorney, Agent, or Firm*—Novak Druce + Quigg LLP

(57) ABSTRACT

Method and arrangement for providing a vehicle having an internal combustion engine and a drivetrain coupled to the internal combustion engine. A control unit is utilized for automatic gear selection, based on a function of the current rotational speed of an input shaft to the gearbox, and in which the control unit is designed to assume a first operating mode having a first working speed range with a first lower limit for downshifting to a gear with a higher transmission ratio.

11 Claims, 10 Drawing Sheets

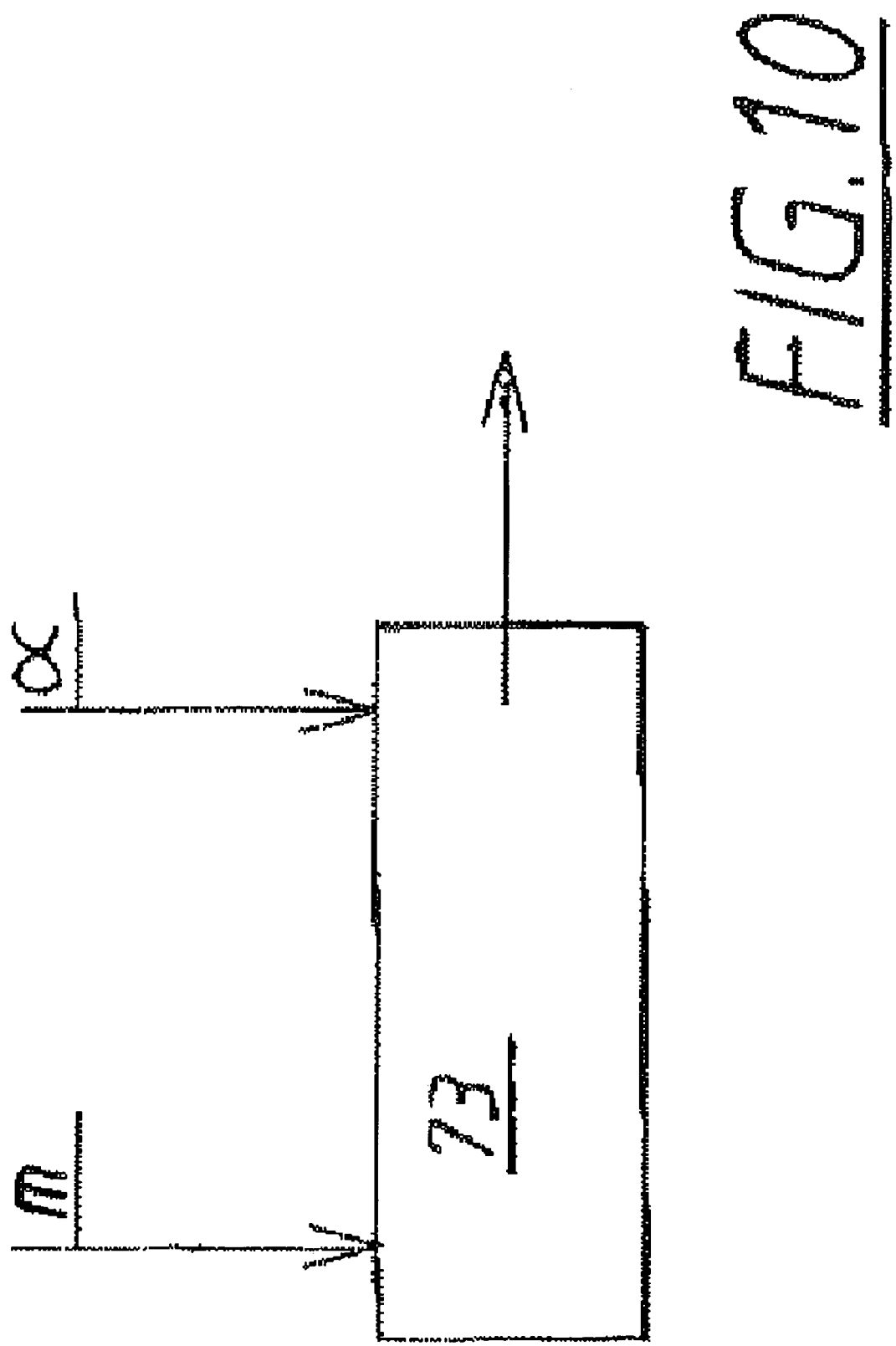

VEHICLE AND METHOD FOR AUTOMATIC GEAR SELECTION IN A GEARBOX FORMING PART OF A VEHICLE

CROSS-REFERENCE TO RELATED APPLICATIONS

The present application is a continuation patent application of International Application No. PCT/SE02/01992 filed 31 Oct. 2002 which was published in English pursuant to Article 21(2) of the Patent Cooperation Treaty, and which claims priority to Swedish Application No. 0103615-1 filed 31 Oct. 2001. Both applications are expressly incorporated herein by reference in their entireties.

TECHNICAL FIELD

The present invention relates to a vehicular drivetrain, having an internal combustion engine and a gearbox coupled to the internal combustion engine, and a control unit for automatic gear selection as a function of the current rotational speed of an input shaft to the gearbox. The control unit has a first operating mode with a first working speed range defined by a first lower limit for downshifting to a gear with a higher transmission ratio. The invention also relates to a method for automatic gear selection in a gearbox forming part of a vehicle as a function of the current rotational speed of a shaft forming part of the gearbox.

BACKGROUND ART

In order to facilitate their handling, vehicles are sometimes provided, where appropriate, with automatic gearboxes. The term automatic gearboxes relates to all types of gearboxes in which gears are selected without the direct intervention of an operator or driver. An example of an automatic gearbox in which gears are selected via an electronic control unit is given in EP 155043. Where appropriate, automatic gearboxes can be set to an operating mode in which the operator or driver selects gears by activating a gear selector. An example of a gear selection device is given in WO 01/55622. The invention can also be used in a type of gearbox in which the device described in WO 01/55622 is used, in which gears are selected without the direct intervention of an operator or driver.

In known electronically controlled automatic gearboxes, downshifting to a lower gear is controlled in that a control element receives information on the current rotational speed of the gearbox or alternatively the current rotational speed of an engine coupled to the gearbox. Downshifting is done in order to ensure that sufficient torque is available to drive the gearbox. FIG. 1 shows a torque curve giving the torque delivered as a function of the speed of a diesel internal combustion engine. The torque curve shows a relatively steep flank from the idling speed, after which the torque levels out around an operating range and then falls sharply. In order to achieve good driveability in a vehicle having an internal combustion engine, a signal for downshifting to a lower gear is emitted when the internal combustion engine is in an operating condition corresponding to an engine speed situated approximately midway along the steep flank. For conventional diesel engines intended for heavy trucks the gearbox control unit is designed with a higher transmission ratio of up to approximately 800-1200 rpm, depending, for example, on load, gradient and accelerator pedal position. A common idling speed for internal combustion engines intended for heavy trucks is approximately 600 rpm.

Gearboxes for heavy vehicles are normally equipped with a large number of gear positions. A normal number of gears for a vehicle in forward drive may be 12 to 18 gears. This means that the difference in transmission ratio between two gears is relatively slight, and therefore a large number of gears will be encountered when running at varying speed or varying torque. This is normally positive when a heavily laden vehicle can accelerate freely from stationary to the desired running speed. On the other hand, gearshifts are experienced as problematical in driving situations in which a driver has temporarily released the throttle before accelerating away immediately thereafter, as when a vehicle slows down in cornering or taking a roundabout, for example. Another example of operating interference due to frequent gearshifts is when a vehicle has to be driven in a line of traffic, in which a sequence of gearshifts under torque occurs despite the fact that the driver primarily wishes to maintain and adjust the speed of his vehicle to the speed of the line of traffic. Unwanted gearshifts generally cause characteristics in the vehicle that are difficult to control, firstly since the drive torque to the wheels of the vehicle varies with the gear ratio in the gearbox, and secondly because the gearshift sequence takes a relatively long time during which the working of the drivetrain is interrupted. The overall result is a drive torque that is difficult to control, to the detriment of the vehicle handling characteristics.

DISCLOSURE

An object of the invention is to provide a vehicle containing an internal combustion engine and a drivetrain coupled to the internal combustion engine, comprising (including, but not limited to) a gearbox and a control unit for automatic gear selection as a function of the current rotational speed of an input shaft to the gearbox, and in which the controllability of the drive torque is increased when operating the vehicle under low engine load. This object is achieved by a vehicle including a drivetrain and having an internal combustion engine and a gearbox coupled to the internal combustion engine. A control unit is provided for automatic gear selection as a function of the current rotational speed of an input shaft to the gearbox. The control unit has a first operating mode with a first working speed range defined by a first lower limit for downshifting to a gear with a higher transmission ratio. In addition to a first operating mode corresponding to normal driving with a first downshift limit, the arrangement can assume a second operating mode having a second working rotational speed with a second lower limit for downshifting to a gear with a higher transmission ratio, in which the second limit is lower than the idling speed of the internal combustion engine and is equal to a lower rotational speed than the first limit. This permits a larger working range in which fewer gears will be encountered, thus giving the driver improved torque control. By means of the present invention, therefore, the vehicle can be driven at idling speed while ever sufficient torque is available. In such cases the speed of the vehicle is determined by the gear engaged.

The term transmission ratio relates to the input rotational speed to the gearbox divided by the output rotational speed from the gearbox.

In a first preferred embodiment, the control unit comprises a memory unit in which a representation of the highest permitted gear in the second working speed range is stored. This ensures that the correct gear is engaged and that sufficient torque is available.

In a second preferred embodiment, the control unit is coupled to elements for indicating the selection of first or second operating mode.

In a third preferred embodiment, the control unit is designed to select the highest permitted gear when the control unit has assumed the second operating mode.

In a fourth preferred embodiment, the specified torque at the idling speed is controlled by an idling speed regulator connected to the internal combustion engine of the vehicle. This means that the vehicle can be driven at constant speed in a manner easily controllable by the driver.

In a fifth preferred embodiment, of the invention, the representation of the highest permitted gear comprises a representation defining the highest permitted gear at idling speed as a function of the current weight of the vehicle and the current gradient of the road on which the vehicle is being driven. Basing the representation of the highest permitted gear on information on the vehicle weight and the road gradient means that the dynamic conditions of the vehicle are given, so that the magnitude of the required drive torque can be estimated with a good degree of accuracy.

In a sixth preferred embodiment, the control unit contains a representation defining the highest permitted starting gear as a function of the current weight of the vehicle and the current gradient of the road on which the vehicle is being driven. According to this embodiment the representation defining the highest permitted gear at idling speed is based on the representation defining the highest permitted starting gear. This means that available information can be used for two purposes, thereby saving on data capacity.

In a seventh preferred embodiment, the representation defining the highest permitted gear at idling speed consists of the representation defining the highest permitted starting gear plus a predetermined number of gear shift stages. The preferred embodiment provides a gear selection when driving at idling speed, which by very simple means gives sufficient available torque at idling speed.

In an eighth preferred embodiment, the vehicle contains elements for establishing that the internal combustion engine is delivering sufficient torque for operation of the vehicle at an operating speed equal to a rotational speed of a gearbox input shaft below the first limit. This element ensures that sufficient torque is available for operation in the highest permitted gear. Should sufficient torque not be available, the control unit ensures that a lower gear is selected.

In a ninth preferred embodiment, the vehicle drivetrain contains a clutch unit arranged between the internal combustion engine and the gearbox, the drivetrain being divided into a first part up to the clutch unit and comprising the internal combustion engine and a second part from the clutch unit onwards and comprising the gearbox. According to this ninth embodiment the second downshifting limit is equal to a speed lower than the idling speed of the internal combustion engine, and the vehicle furthermore contains a sensor for measuring the current rotational speed, the sensor being designed to measure the rotational speed in the second part of the drivetrain. According to this embodiment, the clutch unit is designed to absorb a speed differential between the rotational speed of the first and second parts of the drivetrain where insufficient torque has been delivered from the internal combustion engine, following which a rotational speed equal to the second downshifting limit is reached and downshifting is permitted. This embodiment provides highly reliable elements for establishing that the internal combustion engine is delivering sufficient torque.

In a tenth preferred embodiment, the control unit is designed to establish that the internal combustion engine is delivering sufficient torque by performing a comparison between an estimate of the torque delivered by the internal combustion engine in the current operating state and the torque demanded from the internal combustion engine for operation of the vehicle in the current operating state.

In an eleventh preferred embodiment, the elements for indicating selection of the first or second operating mode comprise a throttle lever forming part of the vehicle, the control unit being designed to assume its second operating mode should the throttle lever be released into an idling position whilst in motion. By utilizing the throttle lever and the fact that a driver releases the throttle lever in a given operating situation, entry into the second operating mode occurs in a natural vehicle operating state, thereby improving the handling drive characteristics of the vehicle.

The invention also relates to a method for automatic gear selection in a gearbox forming part of a vehicle as a function of the current rotational speed of a shaft forming part of the transmission. In an exemplary embodiment, the method provides a vehicle in which operation for the highest permitted gear is allowed within a larger working range, so that fewer gearshifts will be performed, thereby improving a driver's control over the drive torque.

Other preferred embodiments relating to methods of automatic gear selection have advantages in common with the aforementioned preferred embodiments of the vehicle.

DESCRIPTION OF DRAWINGS

A preferred embodiment of the invention will be described in more detail below with reference to the drawings attached, in which:

FIG. 10 shows a detail from the flow chart shown in FIG. 8.

MODE FOR INVENTION

Figure 2:
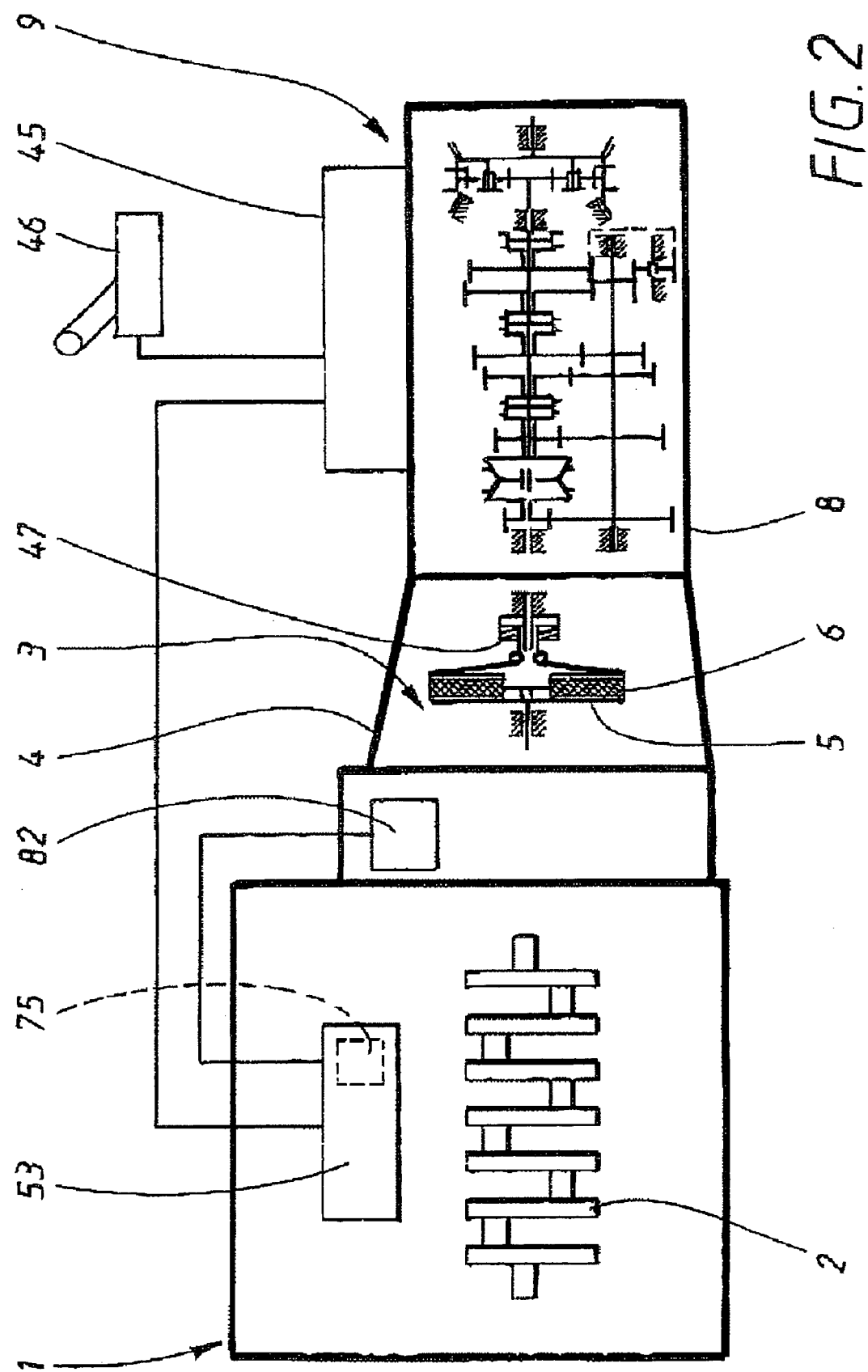
FIG. 2 shows a schematic representation of a type of internal combustion engine with drivetrain in which the invention can advantageously be used.

FIG. 2 shows a schematic representation of a type of internal combustion engine with drivetrain in which the invention can advantageously be used. The reference numeral 1 denotes a six-cylinder internal combustion engine, for example a diesel engine, the crankshaft 2 of which is coupled to a single-disk dry-plate clutch generally denoted by 3, which is enclosed in a clutch cover 4. The crankshaft 2 is rotationally fixed to the clutch housing 5 of the clutch 3, while the plate disk 6 thereof is rotationally fixed to an input shaft 7, which is rotatably supported in the casing 8 of a gearbox generally denoted by 9. A main shaft 10 and an intermediate shaft 11 are rotatably mounted in the casing 8. An electrical machine 82, which is an integrated starter motor and alternator, which can thus be controlled either as motor for driving the crankshaft 2 of the internal combustion engine or, driven by the engine crankshaft, as alternator for generating electrical current, is connected between the crankshaft 2 of the engine and the clutch 3.

Figure 3:
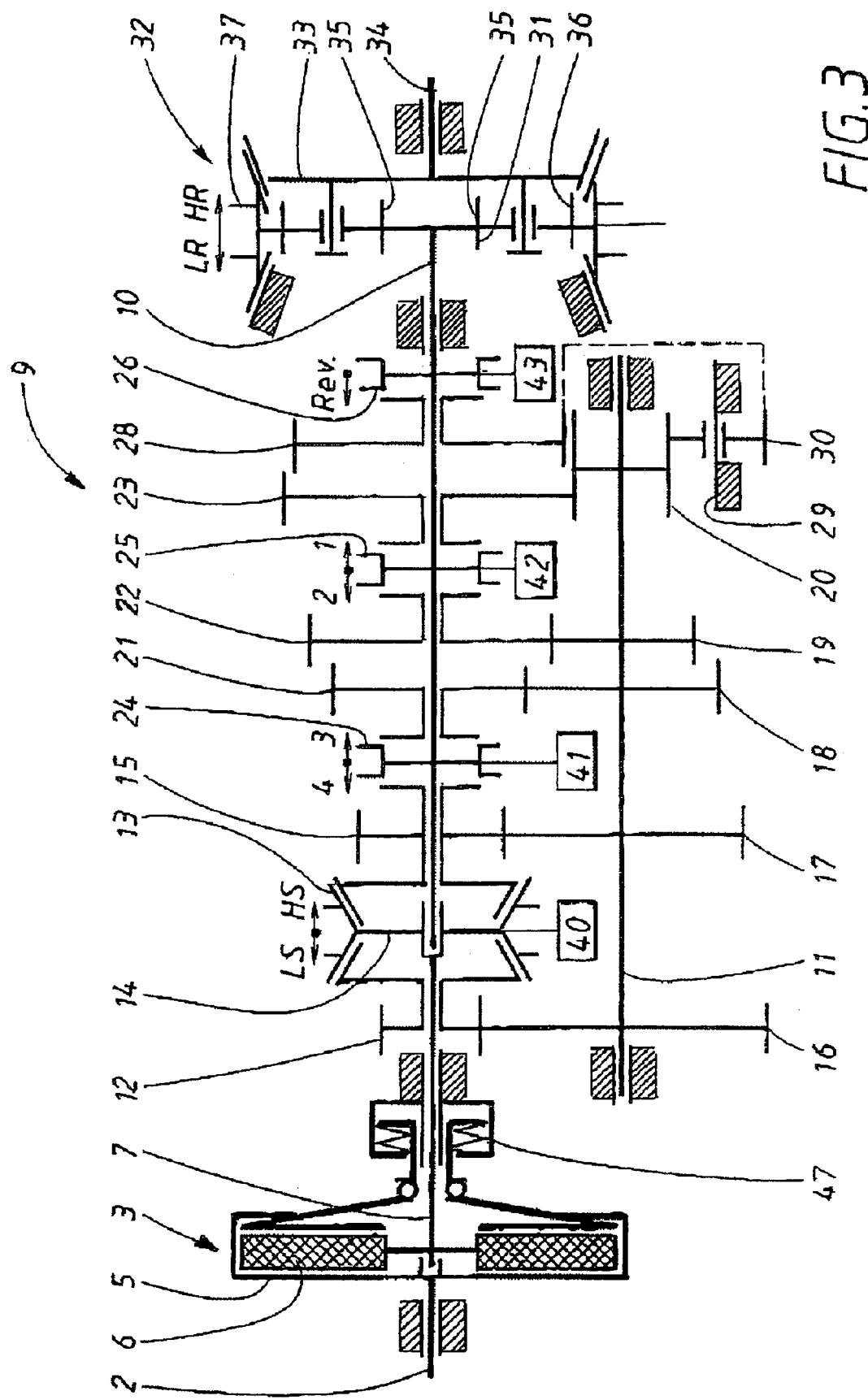
FIG. 3 shows a schematic representation of a gearbox of a type in which the invention can advantageously be used.

As can be most clearly appreciated from FIG. 3, a gear 12 is rotatably mounted on the input shaft 7 and can be locked to the shaft by means of a clutch sleeve 13, which is provided with synchromesh elements and is supported so that it cannot rotate but is axially displaceable on a hub 14 rotationally fixed to the input shaft. By means of the clutch sleeve 13, a gear 15 rotatably supported on the main shaft 10 can also be locked in relation to the input shaft 7. With the clutch sleeve 13 in a middle position, both gears 12 and 15 are disengaged from their shafts 7 and 10 respectively. The gears 12 and 15 mesh with gears 16 and 17 respectively, which are rotationally fixed to the intermediate shaft 11. Further gears 18, 19 and 20 are torsionally fixed on the intermediate shaft 11, these gears meshing with gears 21, 22 and 23 rotatably supported on the main shaft 10, which can be locked on the main shaft by means of clutch sleeves 24 and 25, which in the exemplary embodiment shown lack synchromesh devices. A further gear 28 is rotatably supported on the main shaft 10 and meshes with an intermediate gear 30, which is rotatably supported on a separate shaft 29 and which in turn meshes with the intermediate shaft gear 20. The gear 28 can be locked on its shaft by means of a clutch sleeve 26.

The gear pairs 12, 16 and 15, 17 together with the clutch sleeve 13 form a splitter group having a low shift stage LS and a high shift stage HS. The gear pair 15, 17 together with the gear pairs 21, 18, 22, 19, 23, 20 and 28, 30 form a basic gearbox with four forward gears and one reverse gear. Torsionally fixed to the output end of the main shaft is a gear 31, which forms the sun gear in a split-range transmission of the planetary-type denoted by 32, the planet wheel carrier 33 of which is torsionally fixed to a shaft 34, which forms the gearbox output shaft. Planet wheels 35 of the range transmission 32 mesh with an annular gear 36, which by means of a clutch sleeve 37 can be locked in relation to the gearbox casing 8 for low range LR and in relation to the planet wheel carrier 33 for high range HR. The clutch sleeves 13, 24, 25, 26 and 37 are displaceable as indicated by the arrows in FIG. 3, giving the shift positions shown adjacent to the arrows. They are displaced by servo devices 40, 41, 42, 43, and 44, indicated schematically in FIG. 3, which may be electro-pneumatically operated piston-cylinder arrangements of the type used in a gearbox of the above-mentioned type, marketed under the trademark, GEARTRONIC.

The servo devices 40, 41, 42, 43 and 44 are controlled by an electronic control unit 45 (FIG. 2), comprising a microprocessor, as a function of signals representing various engine and vehicle data that are fed into the control unit, which cover at least the engine speed, road speed, accelerator pedal position and, where appropriate, engine brake off/on, when an electronic gear selector 46 coupled to the control unit 45 is in its automatic shift position. When the selector is in the manual shift position, shifting is performed at the driver's command via the gear selector 46. A management unit 53 separately assigned to the engine also controls the fuel injection, that is to say the engine speed, as a function of the accelerator pedal position and the air supply to a pneumatic piston-cylinder arrangement 47, by means of which the clutch 3 is disengaged.

Figure 4:
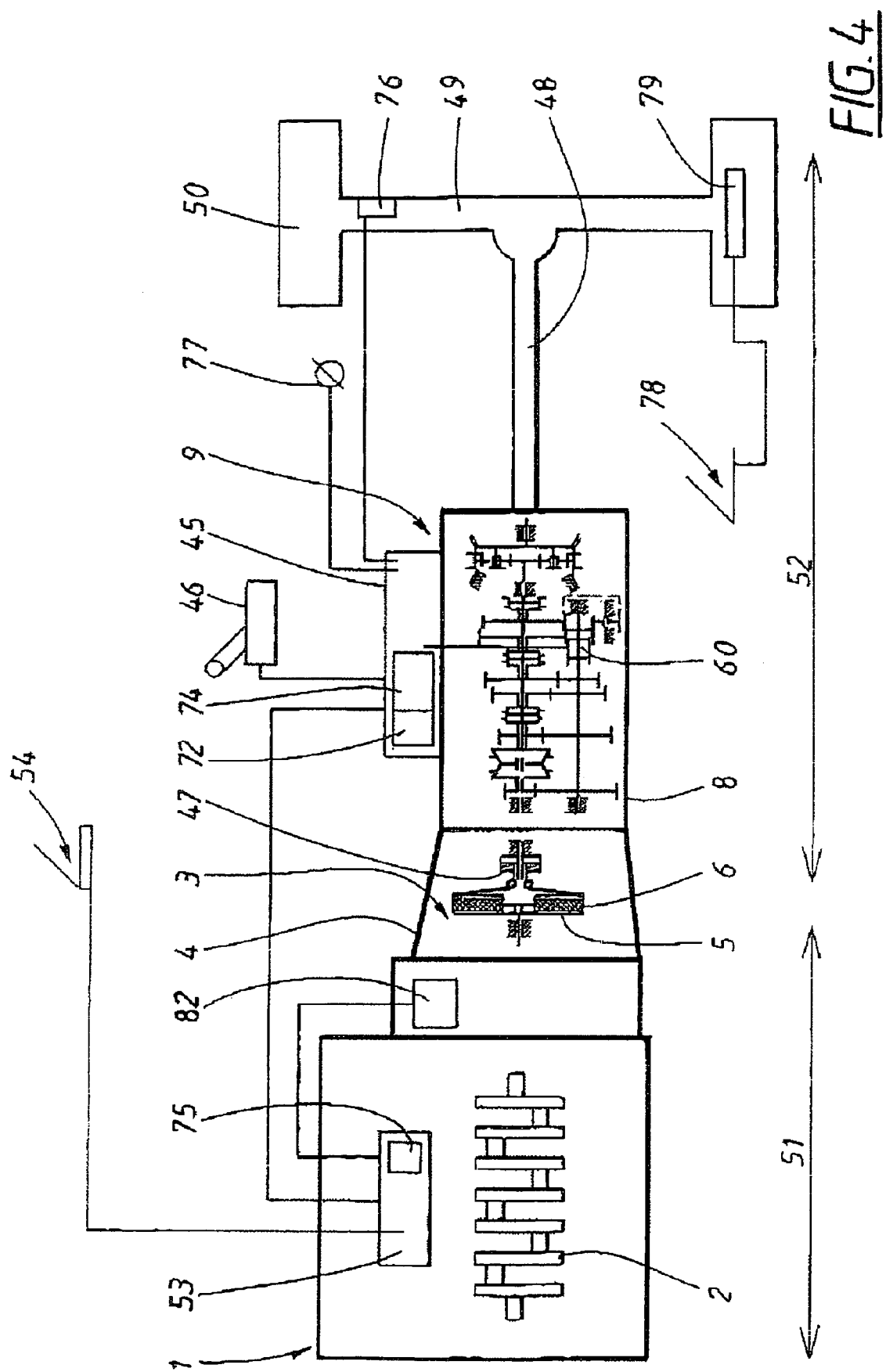
FIG. 4 shows a schematic representation of a drivetrain.

FIG. 4 shows a schematic representation of a drivetrain. The drivetrain comprises the internal combustion engine 1, the clutch 3 where appropriate, the gearbox 9, a drive shaft 48 coupled to the gearbox output shaft, driven axle 49 and wheel 50. According to one embodiment of the invention, which has also been described above, the internal combustion engine 1 is coupled to the gearbox 9 via a clutch 3, which may be of dry-plate type. The drivetrain is thereby divided into a first part 51, which extends up to the clutch unit and includes the internal combustion engine 1, and a second part 52 from the clutch unit 3 which comprises the gearbox 9 together with a control unit 45 for automatic gear selection as a function of the current rotational speed of a gearbox input shaft.

The internal combustion engine is conventionally controlled by an engine management unit 53, which among other things controls the fuel injection quantity as a function of a current operating state of the vehicle. A decisive parameter for the operating state is the torque demand, which is controlled from a throttle lever 54 situated on the vehicle.

The engine management unit 53 may be included in the aforementioned control unit 45 for automatic gear selection, or the engine management unit may alternatively be a separate unit in communication with the control unit 45.

According to a preferred embodiment the vehicle furthermore comprises elements for estimating the vehicle weight 76 and elements 77 for estimating the current gradient of the road on which the vehicle is being driven. The elements are designed in a way familiar to the person skilled in the art; for example the elements for estimating the vehicle weight may take the form of pressure load cells placed in the vehicle pneumatic suspension. The elements for estimating the road gradient may take the form of a gyro.

Figure 5:
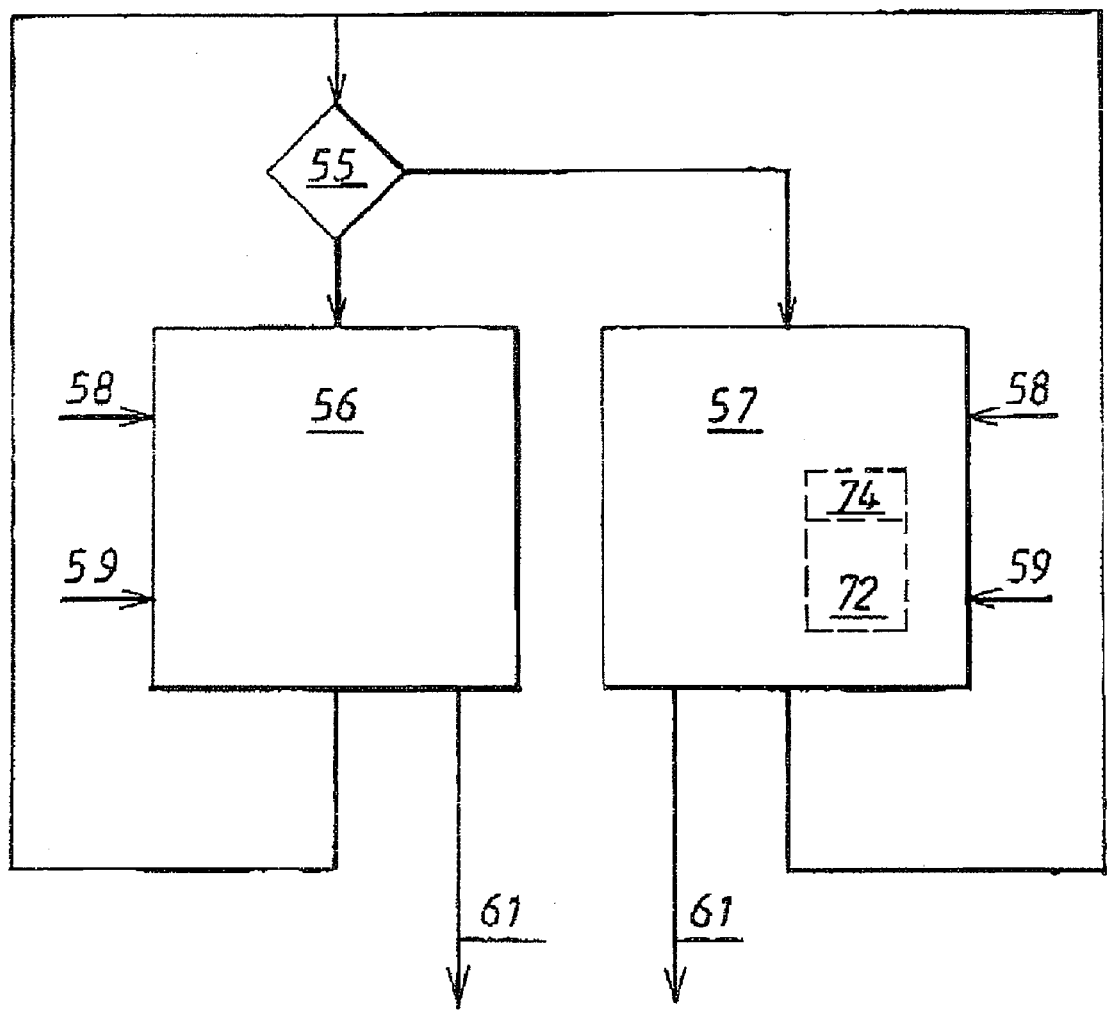
FIG. 5 shows a schematic representation of a control algorithm for the gearbox control unit.

The microprocessor arranged in the control unit 45 for automatic gear selection is designed to be controlled according to a control algorithm, which is shown in FIG. 5. A first processing stage asks 55 for the selection of first or second operating mode as indicated by operating mode selection indicator elements, which according to a preferred embodiment of the invention consist of the throttle lever 54. According to a preferred embodiment of the invention the control unit 45 assumes the second operating mode when a driver releases the throttle lever 54 in operation of the vehicle. The control unit will be kept in the second operating mode either until the brake pedal 78 present on the vehicle activates brakes 79 present on the vehicle, or until the throttle opening exceeds a specific upper limit, preferably corresponding to a throttle opening of 25-35%. According to one embodiment of the invention the control unit leaves its second operating mode when upshifting has occurred to a gear which lies outside the gear range which is defined by the interval between the lowest gear and the highest permitted gear when idling. If the first operating mode 56 has been selected, shifting is performed according to a first gear selection algorithm, and if the second operating mode 57 has been selected shifting is performed according to a second gear selection algorithm. The control unit undertakes a recurrent updating of the operating mode selection so that in operation the vehicle is in the correct operating mode.

As a minimum, input data for each operating mode comprise information on the throttle opening 58, which is given from the throttle lever 54, and information on the current rotational speed 59 of the internal combustion engine or the drivetrain. In some familiar embodiments of control systems for vehicles, there are a number of sensors which register the engine speed and/or the rotational speed of shafts forming part of the gearbox 9. In the exemplary embodiment shown in FIG. 4 an inductive sensor 60 coupled to the intermediate shaft 11 in the gearbox 9 supplies information on the rotational speed of the intermediate shaft. From the aforementioned information containing data on the throttle opening 58 and the rotational speed 59, the respective control algorithm in the first and the second operating modes supplies output data 61 in the form of a selected gear. This output data in turn controls servo devices 40, 41, 42, 43 and 44 forming part of the gearbox 9, the gearbox transmitting torque through the required gear.

Figure 6:
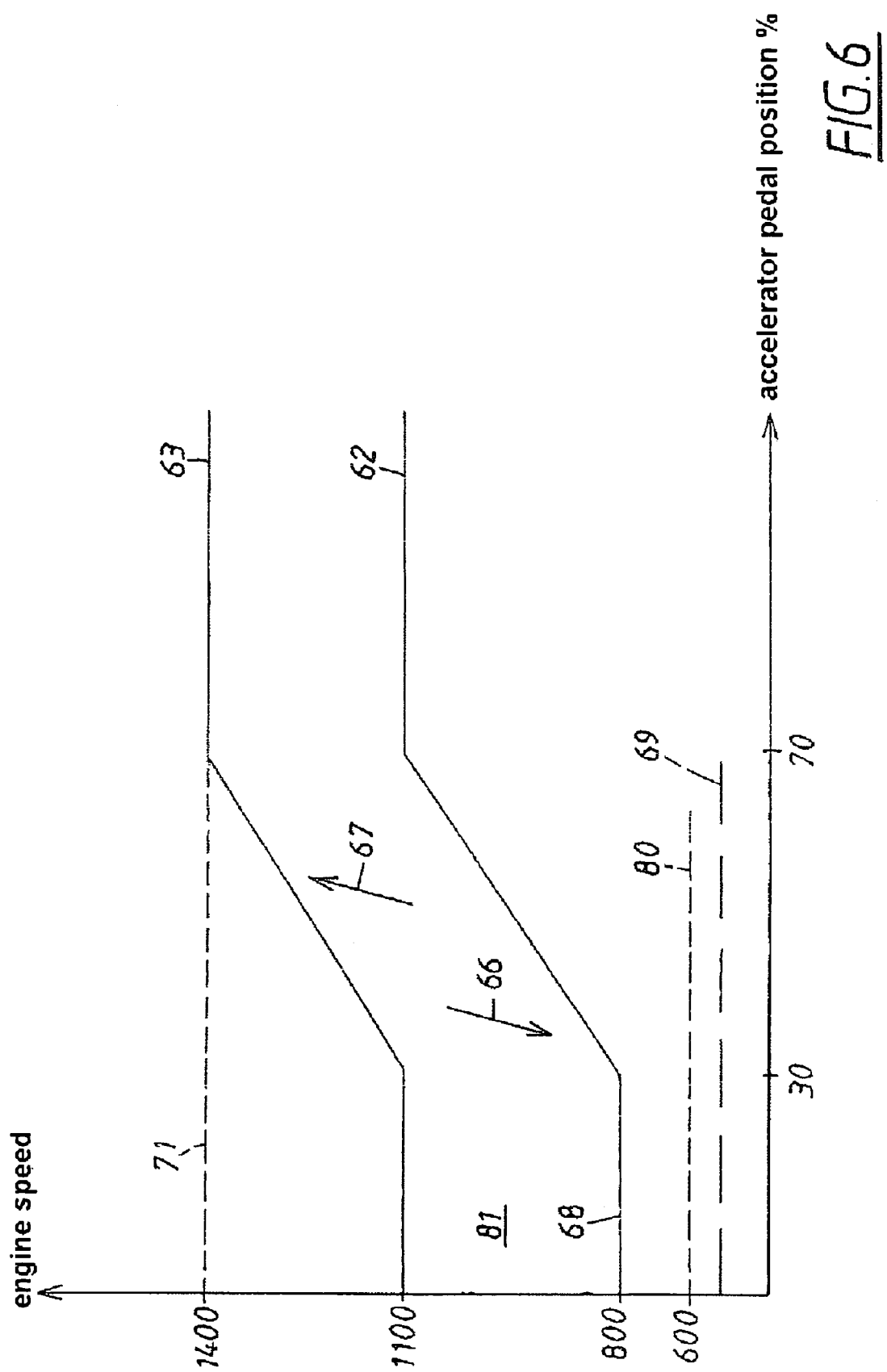
FIG. 6 shows a gear selection diagram.

FIG. 6 shows a schematic representation of a gear selection strategy for upshifting and downshifting. The gear selection strategy that is used in the first normal mode is represented by solid lines and the gear selection strategy that is used in the second mode is represented by dashed lines. The gear selection strategy is described in a diagram with accelerator pedal position on the horizontal axis and the engine speed on the vertical axis. The lower curve 62 corresponds to a lower limit for downshifting to a gear with a higher transmission ratio. If the lower curve 62 is passed with engine speed falling as indicated by the arrow 66, downshifting occurs. The upper curve 63 corresponds to an upper limit for upshifting to gear with a lower transmission ratio. If the upper curve 63 is passed with engine speed increasing as indicated by the arrow 66 upshifting occurs. Also shown by dashed lines is a second working speed range defined by a second lower limit 69 for downshifting to a gear with a higher transmission ratio. The second limit is lower than the idling speed of the internal combustion engine, which is indicated by a dashed line 80. If the control has assumed its second operating mode, which according to a preferred embodiment occurs if the driver releases the accelerator pedal, once the gearbox has assumed the highest permitted gear for driving at idling speed downshifting will not take place until the rotational speed in the gearbox is equal to a speed that is lower than the idling speed of the internal combustion engine. If the rotational speed is equal to the second lower limit 69, the internal combustion engine is delivering insufficient torque to permit driving at idling speed, so that downshifting occurs. In one embodiment of the invention the vehicle strategy for upshifting is also modified with the result that an upper limit 71 in excess of the upper limit 63 is established. In this case, in the second mode operation without upshifting is permitted in a working range with an upper limit 71, which exceeds the upper limit for operation in the first mode.

The first operating mode 56 defines a first working speed range with a first limit 68 for downshifting to a gear with a higher transmission ratio. This lower limit is represented by the lowest speed acceptable for a slight or non-existent throttle opening. The lower limit relates to the lowest accepted downshifting speed when downshifting by one shift stage. According to the preferred embodiment shown, this limit 68 is defined by a throttle opening of less than 30%.

Figure 7:
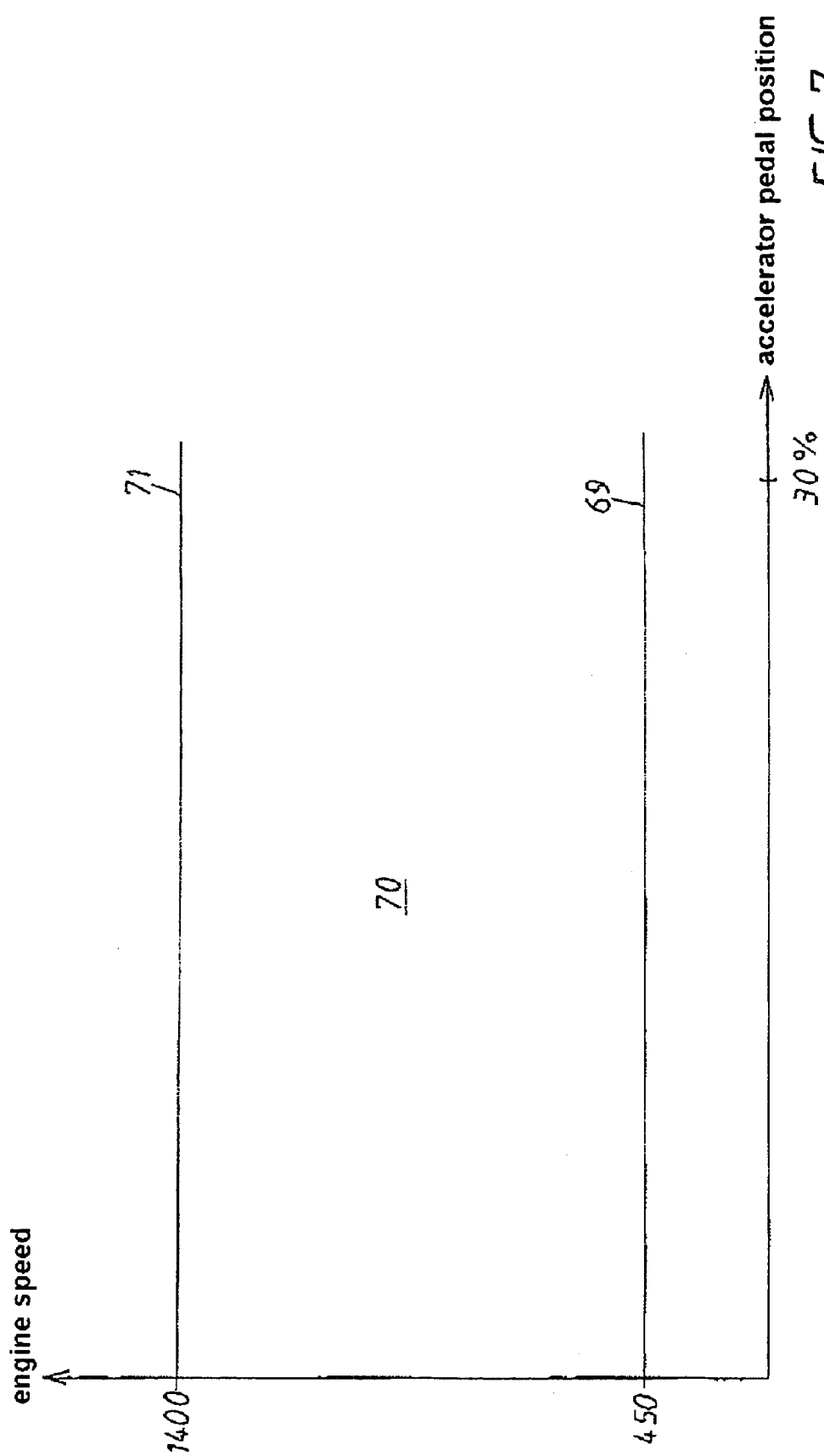
FIG. 7 shows a gear selection diagram in the second operating mode of the control unit.

FIG. 7 shows a schematic representation of a gear selection strategy for upshifting and downshifting respectively, these strategies being used in the second operating mode. When the control unit 45 has assumed the second operating mode 57, the control unit seeks the highest permitted gear in a second working speed range 70, which has a second downshifting limit 69. The second limit is equal to a lower rotational speed than the first limit 68. In a preferred embodiment of the invention the second limit 69 is set to a rotational speed lower than the idling speed of the internal combustion engine 1. In this case the rotational speed must be measured in the drivetrain on that side of the clutch unit where the gearbox 9 is located. According to one embodiment which has been described above, measurement is performed on the intermediate shaft 11 by means of an inductive sensor.

The gear selection strategy also has an upshifting limit 71, which is equal to a high engine speed. According to one embodiment of the invention the upper limit 71 may be set, for example, to 1400 rpm. According to a preferred embodiment the second operating mode 57 only permits limited throttle opening, a higher throttle opening resulting in exit from the second mode 57 and assumption of the first mode 56. According to a preferred embodiment this throttle opening limit is represented by a throttle opening of 30%.

Figure 8:
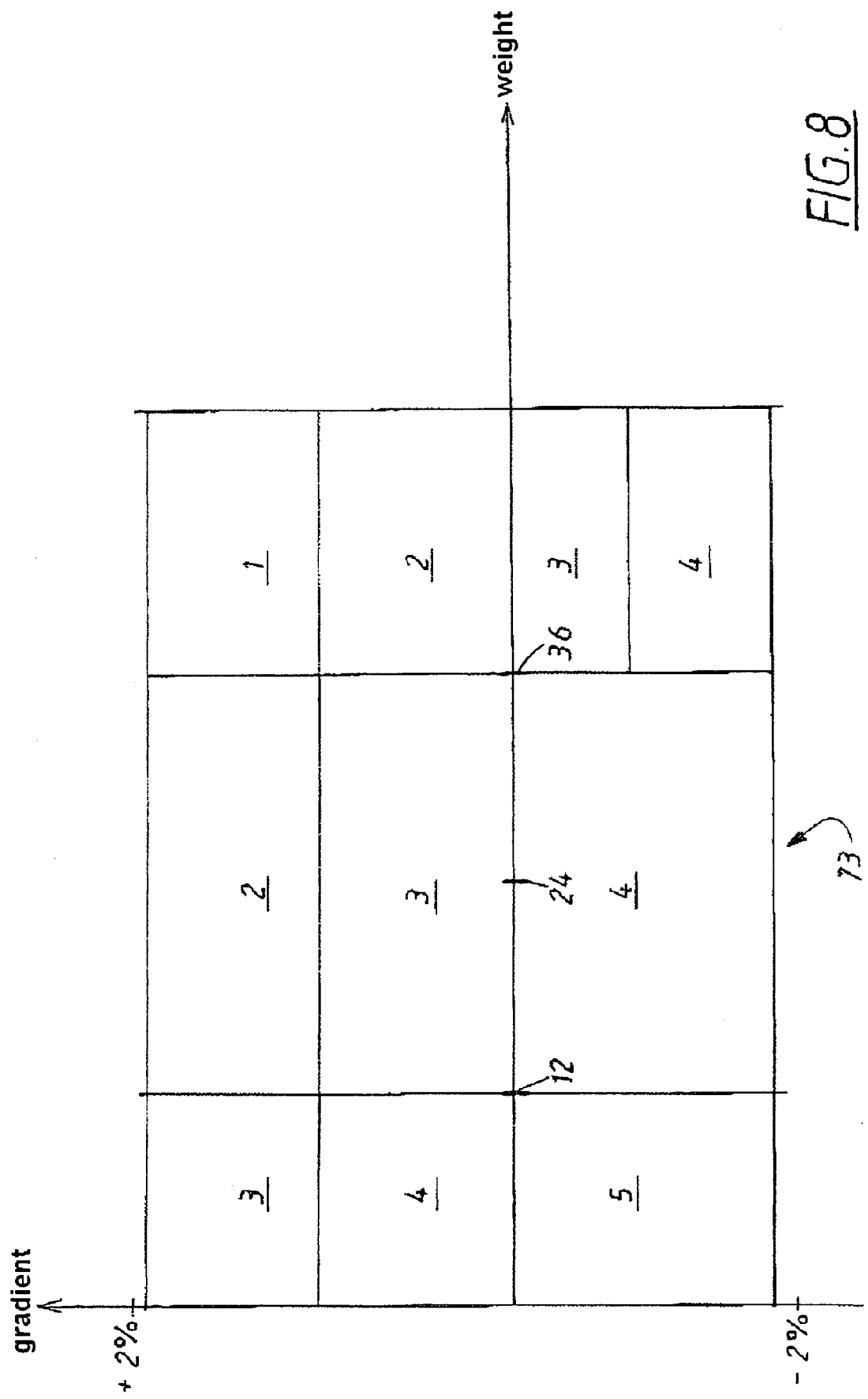
FIG. 8 shows a representation of starting gear selection.

The control unit 45 contains a memory unit 72 in which is stored a representation of the highest permitted gear in the second working speed range. A preferred embodiment of this representation 73 is shown in FIG. 8. The representation 73 defines the highest permitted starting gear as a function of the current weight of the vehicle and current gradient of the road on which the vehicle is being driven. The gradient is given on the vertical axis, a positive inclination indicating an uphill gradient. The weight of the vehicle is given on the horizontal axis. The highest permitted gear is given for the ranges shown in the figure. Information on the weight of the vehicle and the road gradient is supplied by elements for estimating the vehicle weight 76 and elements for estimating the road gradient 77. From this representation 73 a representation 74 is formed of the highest permitted gear for driving at the idling speed of the internal combustion engine and is stored in the second working speed range through the addition of a predetermined number of shift stages, for example 4 where a twelve-speed gearbox is used. When the second operating mode is activated, the control unit 45 receives information on the highest gear selected, this gearshift position being maintained in the substantially larger working range 70.

Figure 1:
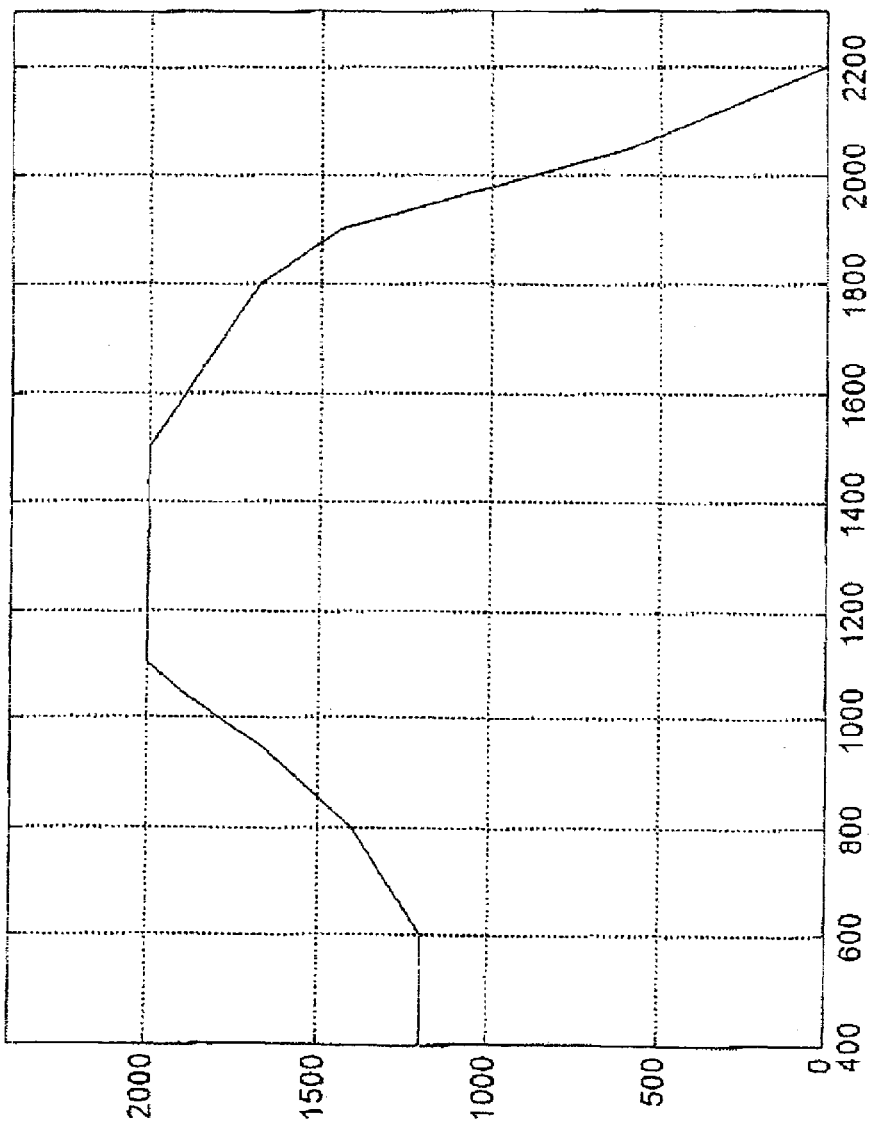
FIG. 1 shows a torque curve from a diesel engine in which the invention can advantageously be used.

The engine management unit 53 contains an idling speed regulator 75, which ensures that the idling speed of the internal combustion engine is maintained under different engine loads. It will be seen from FIG. 1 that at idling speed, that is to say approximately 600 rpm, the internal combustion engine has an available torque equal to approximately 50% of the maximum torque. This means that the engine has the capacity to drive the vehicle down to the idling speed, provided that a sufficiently low gear is used. If the second limit 69 is set to a speed equal to the idling speed or lower, the idling speed regulator can thus be used for stable operation of the vehicle at a relatively constant speed of travel.

According to a preferred embodiment of the invention the vehicle contains elements for establishing that the internal combustion engine is delivering sufficient torque for operation of the vehicle in the second working speed range 70. According to one embodiment these elements, comprise the control unit 45, which calculates the available torque and compares this with a torque demand based on the gear selected, the vehicle weight and the road gradient. According to a second embodiment of the invention the elements comprise the vehicle clutch 3, which in this case must be designed so that a differential speed occurs over the clutch when the engine is incapable of delivering the torque that is required in the current operating state. In this case the second downshifting limit is located below the idling speed, slipping of the clutch occurring in the event of insufficient torque being available. A gradual disengagement then occurs so that the second limit 69 is reached and downshifting takes place. In this case the control unit does not leave the second operating mode but preferably remains with a new highest accepted gear.

Figure 9:
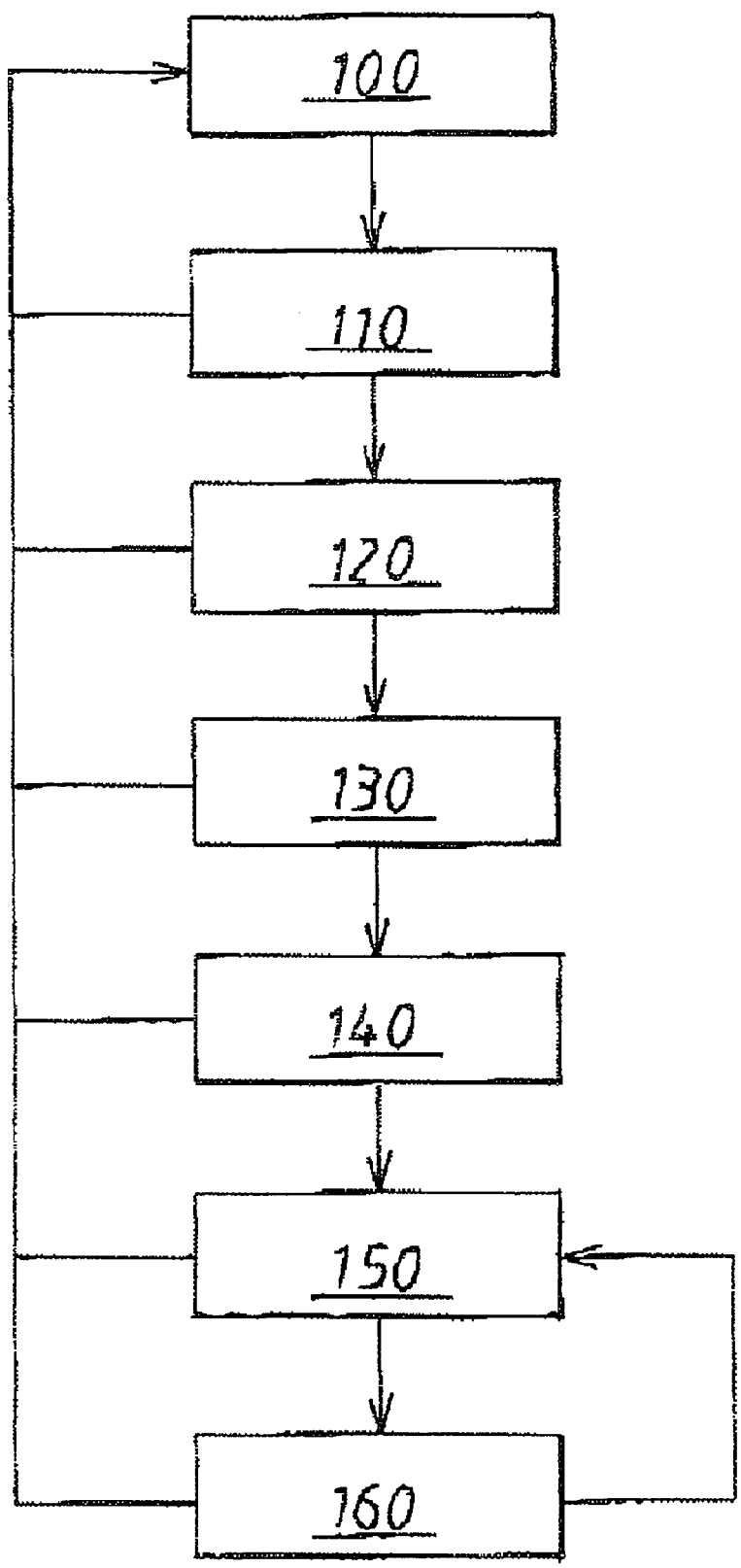
FIG. 9 shows a flow chart for a method for automatic selection of gearshift position.

FIG. 9 shows a flow chart for a method of automatic gear selection in a gearbox forming part of a vehicle as a function of the current rotational speed of a shaft forming part of the gearbox. The method comprises a first stage 100 establishing a first operating mode of a control unit, in which the first operating mode comprises a first working speed range with a first lower limit for downshifting to a gear with a higher transmission ratio. In a second stage 110 of the method a second operating mode of the control unit is established in which the second operating mode comprises a second working speed range with a second lower limit for downshifting to a gear with a higher transmission ratio. In a third stage 120 of the method a representation is established of the highest permitted gear in the second working speed range of the control unit. In a fourth stage 130 of the method either the first or second operating mode of the control unit is selected. In a fifth stage 140 of the method a downshift signal to a gearbox is generated on passing the first limit, should the control unit have assumed its first operating mode. In a sixth stage 150 of the method, the vehicle is driven in the highest permitted gear in the second speed range. In a seventh stage 160 of the method a downshift signal to a gearbox is where necessary generated on passing the second limit, should the control unit have assumed its second operating mode. After downshifting, the control unit normally maintains its second operating mode 110. In each stage of the method it is possible to return from the second to the first operating mode. FIG. 10 shows a schematic representation of the sixth stage 150 of the method in which, from input data relating to the vehicle weight 58 and road gradient 59, output data on the highest permitted gear 61 are emitted from a representation 73.

In a preferred embodiment of the method described above, downshifting from the highest permitted gear at idling speed is undertaken following the occurrence of slip in a clutch unit forming part of the vehicle drivetrain, the slip occurring as a result of the fact the torque required to drive the vehicle in the current operating situation is greater than a predetermined torque level of the idling speed regulator of the internal combustion engine.

In a further preferred embodiment of the method described above the control unit assumes its second operating mode in that a throttle lever forming part of the vehicle is released during operation of the vehicle.

The invention is not confined to the exemplary embodiments described above, but can be freely modified without departing from the scope of the following claims. For example, the engine and gearbox may be designed in alternative ways familiar to the person skilled in the art. The drivetrain need not contain a dry-plate clutch but can be designed with a torque converter in a manner familiar to the person skilled in the art. In particular the invention can also be used in more complex gear selection strategies than those described above, such as gear selection strategies involving multiple upshifting or downshifting stages, for example.

The invention claimed is:

1. A vehicle comprising a drivetrain, having an internal combustion engine (1) and a gearbox (9) coupled to the internal combustion engine, and a control unit (45) for automatic gear selection as a function of the current rotational speed of an input shaft to the gearbox (9), in which the control unit (45) has a first operating mode (56) with a first working speed range (81) defined by a first lower limit (68) for downshifting to a gear with a higher transmission ratio, wherein the control unit (45) has a second operating mode (57) with a second working speed range (70) defined by a second lower limit (69) for downshifting to a gear with a higher transmission ratio, in which the second limit (69) is lower than the idling speed (80) of the internal combustion engine and is equal to a lower rotational speed than the first lower limit (68), wherein the control unit (45) comprises a memory unit (72) in which a representation (74) of a highest permitted gear in the second working speed range (70) is stored, wherein the representation (74) of the highest permitted gear comprises a representation (74) defining the highest permitted gear when driving at idling speed as a function of the current weight of the vehicle and the current gradient of the road on which the vehicle is being driven.

2. The vehicle as recited in claim 1, wherein the control unit (45) is configured to select the highest permitted gear or a gear lower than the highest permitted gear when the control unit has assumed the second operating mode (57).

3. The vehicle as recited in claim 1, wherein the control unit is coupled to elements (54) for indicating the selection of first or second operating mode.

4. The vehicle as recited in claim 1, wherein the vehicle contains an engine management unit (53), which comprises an idling speed regulator (75), the idling speed regulator (75) being designed to control the torque delivered from the internal combustion engine (1) when the vehicle is operated at idling speed in the second operating mode (57).

5. The vehicle as recited in claim 1, wherein the control unit (45) contains a representation (73) defining the highest permitted starting gear as a function of the current weight of the vehicle and the current gradient of the road on which the vehicle is being driven, and that the representation (74) defining the highest permitted gear when driving at idling speed is based on the representation defining the highest permitted starting gear.

6. The vehicle as recited in claim 5, wherein the representation (74) defining the highest permitted gear at idling speed consists of the representation defining the highest permitted starting gear (73) plus a predetermined number of gear shift stages.

7. The vehicle as recited in claim 1, wherein the vehicle contains elements (45, 3) for establishing that the internal combustion engine is delivering sufficient torque for operation of the vehicle at an operating speed equal to a rotational speed of a gearbox input shaft below the first limit (68).

8. The vehicle as recited in claim 7, wherein the drivetrain contains a clutch unit (3) arranged between the internal combustion engine and the gearbox, the drivetrain being divided into a first part (51) up to the clutch unit and comprising the internal combustion engine (1) and a second part from the clutch unit (3) onwards and comprising the gearbox (9), characterized in that the second limit (69) for downshifting is equal to a speed lower than the idling speed (80) of the internal combustion engine, that the vehicle contains a sensor for measuring the current rotational speed (60), and that the sensor (60) is designed to measure the rotational speed in the second part (52) of the drivetrain, the clutch unit (3) being designed to absorb a speed differential between the rotational speed of the first and second parts (51, 52) of the drivetrain where insufficient torque has been delivered by the internal combustion engine (1), following which a rotational speed equal to the second downshifting limit is reached and downshifting is permitted.

9. The vehicle as recited in claim 7, wherein the control unit (45) is designed to establish that the internal combustion engine (1) is delivering sufficient torque by performing a comparison between an estimate of the torque delivered by the internal combustion engine (1) in the current operating state and the torque demanded from the internal combustion engine (1) for operation of the vehicle in the current operating state.

10. The vehicle as recited in claim 3, wherein the elements (54) for indicating selection of the first or second operating mode comprise a throttle lever (54) forming part of the vehicle, the control unit being designed to assume its second operating mode (57) should the throttle lever (54) be released into an idling position whilst in motion.

11. The vehicle as recited in claim 1, in which the second working speed range is larger than the first working speed range.

* * * * *